US010047897B2

(12) United States Patent
Leibowits et al.

(10) Patent No.: US 10,047,897 B2
(45) Date of Patent: Aug. 14, 2018

(54) PORTABLE LINE-DRIVEN MOBILE PLATFORM AND SYSTEM THEREOF

(71) Applicant: Hot Larva, LLC, New York, NY (US)

(72) Inventors: Louis Leibowits, New York, NY (US); Aydin Erkohen, New York, NY (US)

(73) Assignee: HOT LARVA, LLC, New York, NY (US)

(*) Notice: Subject to any disclaimer, the term of this patent is extended or adjusted under 35 U.S.C. 154(b) by 0 days.

(21) Appl. No.: 15/197,365

(22) Filed: Jun. 29, 2016

(65) Prior Publication Data

US 2016/0377225 A1 Dec. 29, 2016

Related U.S. Application Data

(60) Provisional application No. 62/186,186, filed on Jun. 29, 2015.

(51) Int. Cl.
F16M 11/00 (2006.01)
F16M 11/18 (2006.01)
A62B 1/00 (2006.01)
F16M 11/12 (2006.01)
F16M 11/42 (2006.01)
F16M 13/02 (2006.01)

(52) U.S. Cl.
CPC ............ F16M 11/18 (2013.01); A62B 1/00 (2013.01); F16M 11/12 (2013.01); F16M 11/425 (2013.01); F16M 13/02 (2013.01)

(58) Field of Classification Search
CPC .... F16M 13/02; F16M 13/027; F16M 13/022; F16M 11/18; F16M 11/2092; F16M 11/08; F16M 11/048; A47F 5/0892
USPC .................... 248/298.1, 317, 323
See application file for complete search history.

(56) References Cited

U.S. PATENT DOCUMENTS

| 5,034,759 | A * | 7/1991 | Watson .................. | B64D 47/08 348/E7.088 |
| 5,400,993 | A * | 3/1995 | Hamilton ............... | F16M 11/10 248/279.1 |
| 2003/0137835 | A1* | 7/2003 | Mier-Langner .......... | F21S 8/06 362/220 |
| 2014/0158959 | A1* | 6/2014 | Davis .................. | F16M 13/027 254/199 |

* cited by examiner

Primary Examiner — Steven M Marsh
(74) Attorney, Agent, or Firm — Loeb & Loeb LLP

(57) ABSTRACT

A movable platform includes a housing having a first side and a second side opposite the first side, the first side having a first port and the second side having a second port. The first and second ports are configured to receive a drive line that has at least one flat side in a twist resistant manner. The movable platform also includes a drive mechanism disposed between the first port and the second port for engaging the drive line, and a support member disposed adjacent to the drive mechanism for guiding the drive line toward or away from the drive mechanism. The movable platform further includes a motor operatively connected to the drive mechanism. The motor provides power to the drive mechanism and causes the drive mechanism to rotate.

21 Claims, 11 Drawing Sheets

PORTABLE LINE-DRIVEN MOBILE PLATFORM AND SYSTEM THEREOF

CROSS-REFERENCE TO RELATED APPLICATIONS

This application claims the benefit of, and priority to, U.S. Provisional Patent Application Ser. No. 62/186,186, entitled "Portable Line-Driven Mobile Platform and System Thereof," filed Jun. 29, 2015, the content of which is incorporated herein by reference in its entirety.

FIELD OF THE INVENTION

The present disclosure generally relates to a portable line-driven mobile platform and system used to carry objects and/or track motion along a predetermined linear path.

BACKGROUND OF THE DISCLOSURE

The amateur film and photography industry has taken off in the past few years with the introduction of portable video and still-frame cameras that may be used to record or photograph various activities, particularly, high speed and adventure activities. There are various types of portable camera systems on the market including those that may be mounted to a person, which film from the viewpoint of the individual, and those that are line driven or sled mounted, which film from the viewpoint of an onlooker.

However, there are several shortcomings with the devices currently on the market. One shortcoming is that they are expensive to use. For example, some sled mounted camera platforms rent for about $4000/week, and the Skycam system, a spool-driven platform, costs $60,000/event to rent and approximately $2.1 million to buy. In addition, most of the line driven camera platforms are large and cumbersome and are mounted to cable systems, which themselves are heavy and unwieldy to handle, making the camera platform less portable. Cable systems are also dangerous as the cables may snap and cause injury. In fact, in the professional filming industry, riggers' unions require that cables be replaced after each use. In addition to being dangerous, the cables themselves function as a pivot point, and exaggerate rocking (side-to-side movement) of the camera platform.

Another shortcoming is that current camera platforms have a single mount point for the camera, which limits the possible angles of video/photographs and number of recording devices and accessories (e.g., lighting) available for each shot. Also, top mounts, which facilitate aerial shooting, are generally unavailable.

Further, current camera platforms are only designed for filming and photography and may not be used to perform other functions such as the transportation of objects or people from one point to another.

The movable platform system disclosed herein seeks to improve upon existing camera platforms by providing a movable platform system that is multipurpose, less expensive, safer, and more portable than the current camera platforms.

SUMMARY OF THE DISCLOSURE

In one aspect, a movable platform is disclosed. The movable platform includes a housing having a first side and a second side opposite the first side, the first side having a first port and the second side having a second port. The first and second ports are configured to receive a drive line that has at least one flat side in a twist resistant manner. The movable platform also includes a drive mechanism disposed between the first port and the second port for engaging the drive line, and a support member disposed adjacent to the drive mechanism for guiding the drive line toward or away from the drive mechanism. The movable platform further includes a motor operatively connected to the drive mechanism. The motor provides power to the drive mechanism and causes the drive mechanism to rotate.

In another aspect, a movable platform system is disclosed. The movable platform system includes a movable platform. The movable platform includes a housing that has a first side and a second side opposite the first side; the first side has a first port and the second side has a second port. The movable platform also includes a drive mechanism disposed between the first port and the second port and a drive line that has at least one flat side. The drive line extends through the housing of the movable platform via the first port and the second port and engages a surface of the drive mechanism. The movable platform is mounted to the drive line in a twist resistant manner. The movable platform system further includes a motor operatively connected to the drive mechanism for rotating the drive mechanism, wherein rotation of the drive mechanism causes the movable platform to move along the drive line.

In another aspect, a movable platform system is disclosed. The movable platform system includes a first movable platform having a housing and a first drive line that extends through the housing of the first movable platform. The movable platform system also includes a platform anchoring assembly attached to the housing of the first movable platform and disposed perpendicular to the drive line. A second drive line having at least one flat side is attached to the platform anchor assembly in a twist resistant manner. A second movable platform mounted on the second drive line in a twist resistant manner. The first drive line is oriented along a first axis such that the first movable platform moves along the first drive line in a first direction, and wherein the second drive line is oriented along a second axis such that the second movable platform moves in a second direction.

In another aspect, an anchor assembly is disclosed. The anchor assembly includes a drive line mount having an first end portion, a second end portion opposite the first end potion, and a center portion disposed between the first and second end portions. The anchor assembly also includes a drive line retainer fastener disposed on the center portion of the drive line mount and a set of drive line retainer teeth disposed on the center portion adjacent to the drive line retainer fastener. The drive line retainer fastener and the set of retainer teeth are configured to engage and secure a drive line having at least one flat side to the drive line mount. The anchor assembly further includes a first swing arm movably attached to the first end portion of the drive line mount for mounting the drive line mount to an anchoring object.

BRIEF DESCRIPTION OF THE DRAWINGS

The invention may be better understood by reference to the detailed description when considered in connection with the accompanying drawings. The components in the figures are not necessarily to scale, emphasis instead being placed upon illustrating the principles of the invention. Persons of ordinary skill in the art will appreciate that elements in the figures are illustrated for simplicity and clarity so not all connections and options have been shown to avoid obscuring the inventive aspects. For example, common but well-understood elements that are useful or necessary in a commercially feasible embodiment are not often depicted in order to facilitate a less obstructed view of these various embodiments of the present disclosure.

In the figures, like reference numerals designate corresponding parts throughout the different views.

DETAILED DESCRIPTION

The present invention now will be described more fully with reference to the accompanying drawings, which form a part hereof, and which show, by way of illustration, specific exemplary embodiments by which the invention may be practiced. These illustrations and exemplary embodiments are presented with the understanding that the present disclosure is an exemplification of the principles of one or more inventions and is not intended to limit any one of the inventions to the embodiments illustrated. The invention may be embodied in many different forms and should not be construed as limited to the embodiments set forth herein; rather, these embodiments are provided so that this disclosure will be thorough and complete, and will fully convey the scope of the invention to those skilled in the art. The following detailed description is, therefore, not to be taken in a limiting sense.

As used herein, the terms first, second, third, and the like are used to distinguish between similar elements and not necessarily for describing a specific sequential or chronological order. The terms are interchangeable under appropriate circumstances and the embodiments of the invention may operate in other sequences than described or illustrated herein.

In addition, the terms top, bottom, front, rear, left, right, upper, lower, and the like as used herein are used for descriptive purposes and not necessarily for describing specific positions. The terms so used are interchangeable under appropriate circumstances and the embodiments described herein may operate in other orientations than described or illustrated herein.

Figure 1:
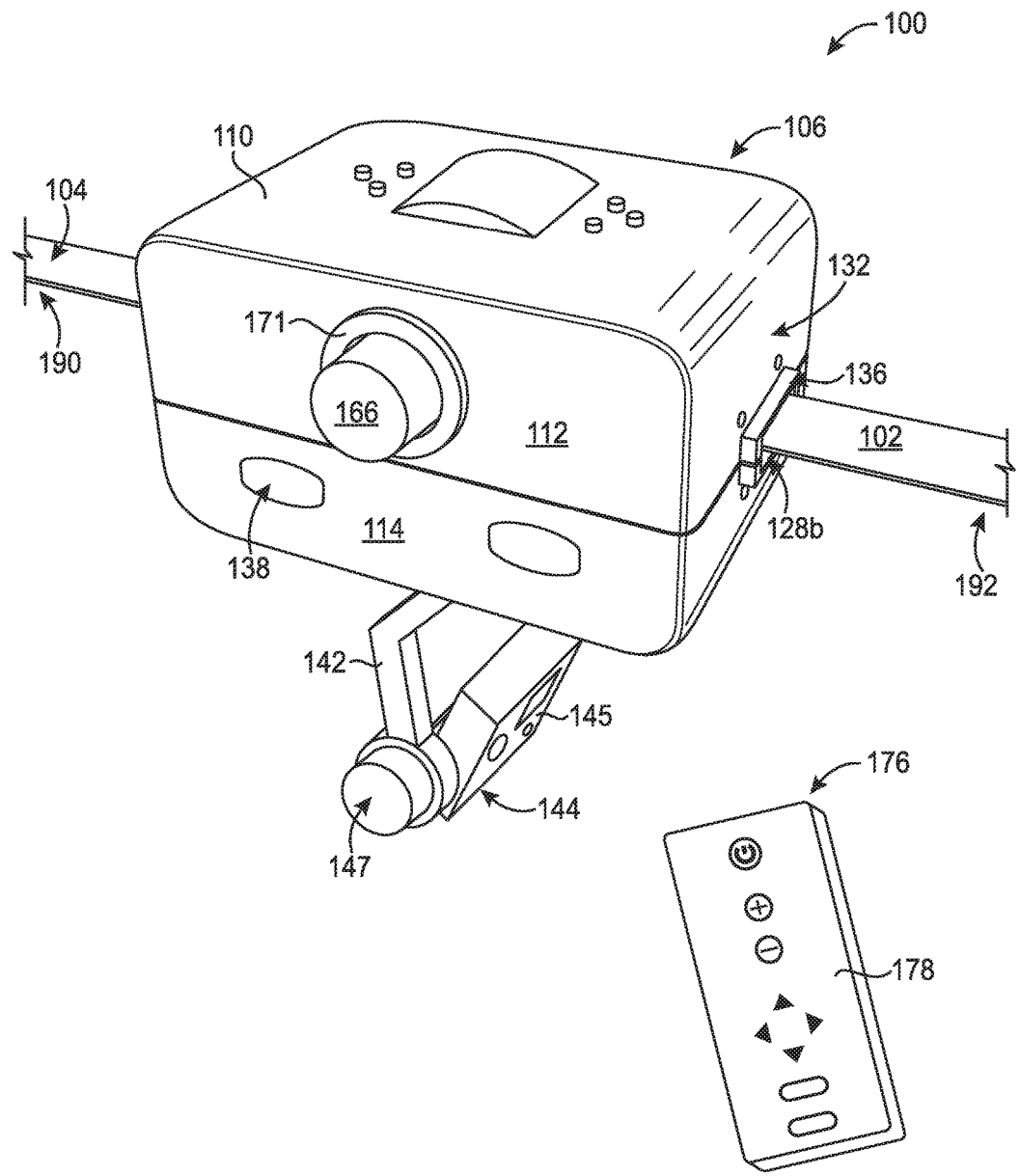
FIG. 1 is an isometric view of an embodiment of a movable platform system.
Figure 1A:
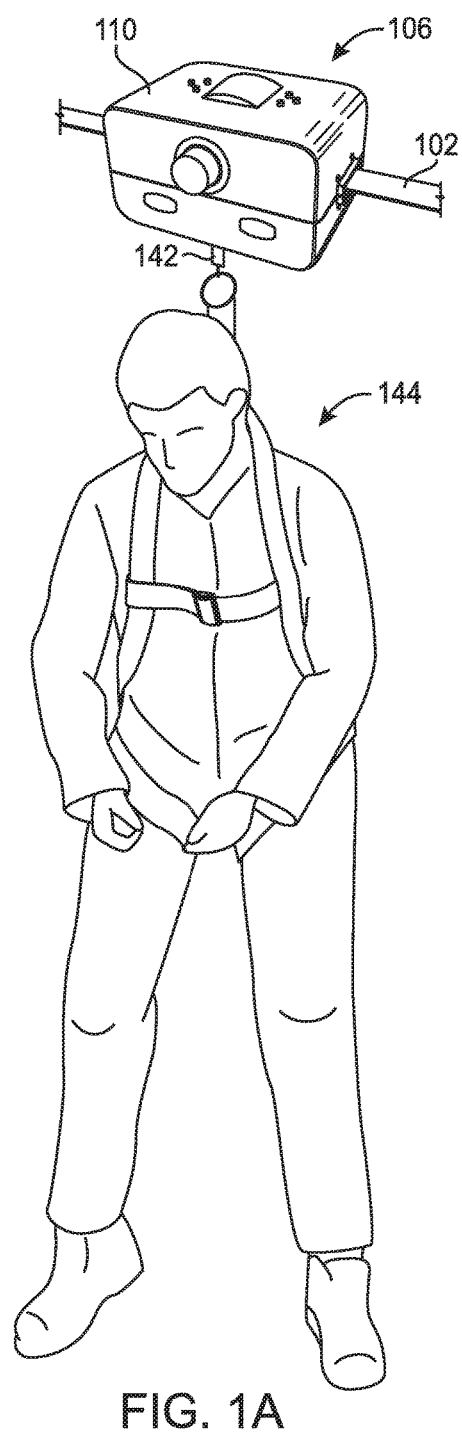
FIG. 1A is an isometric view of another embodiment of the movable platform system of FIG. 1 that may be used to transport people.

Turning to the figures, FIG. 1 illustrates an embodiment of a movable platform system 100. The movable platform system 100 may include a drive line 102 having at least one substantially flat side 104 and a movable platform 106, which may be mounted on the drive line 102 and configured to move along the drive line 102. The movable platform system 100 may also include an anchor assembly 200, 200', 300, or 400 (see FIGS. 5-8) to attach the drive line 102 to an anchoring object that is stationary or movable (see FIG. 9).

Figure 2:
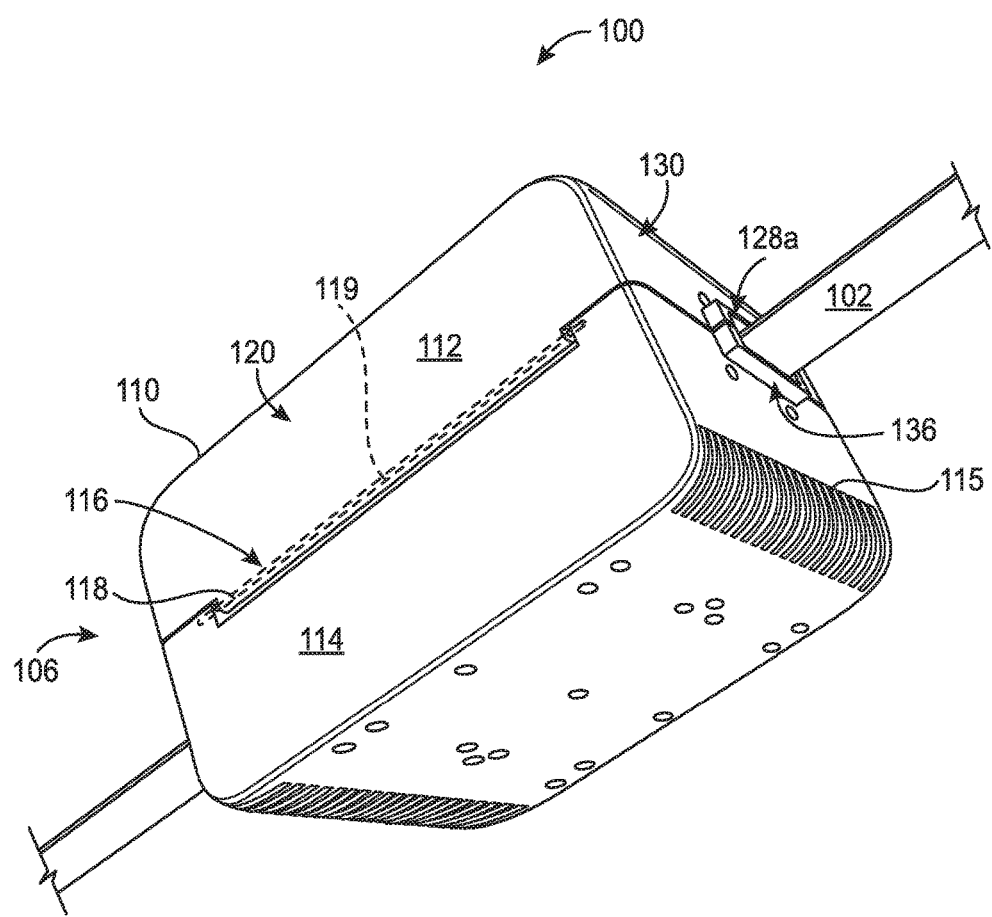
FIG. 2 is a rear isometric view of the movable platform system of FIG. 1.
Figure 3:
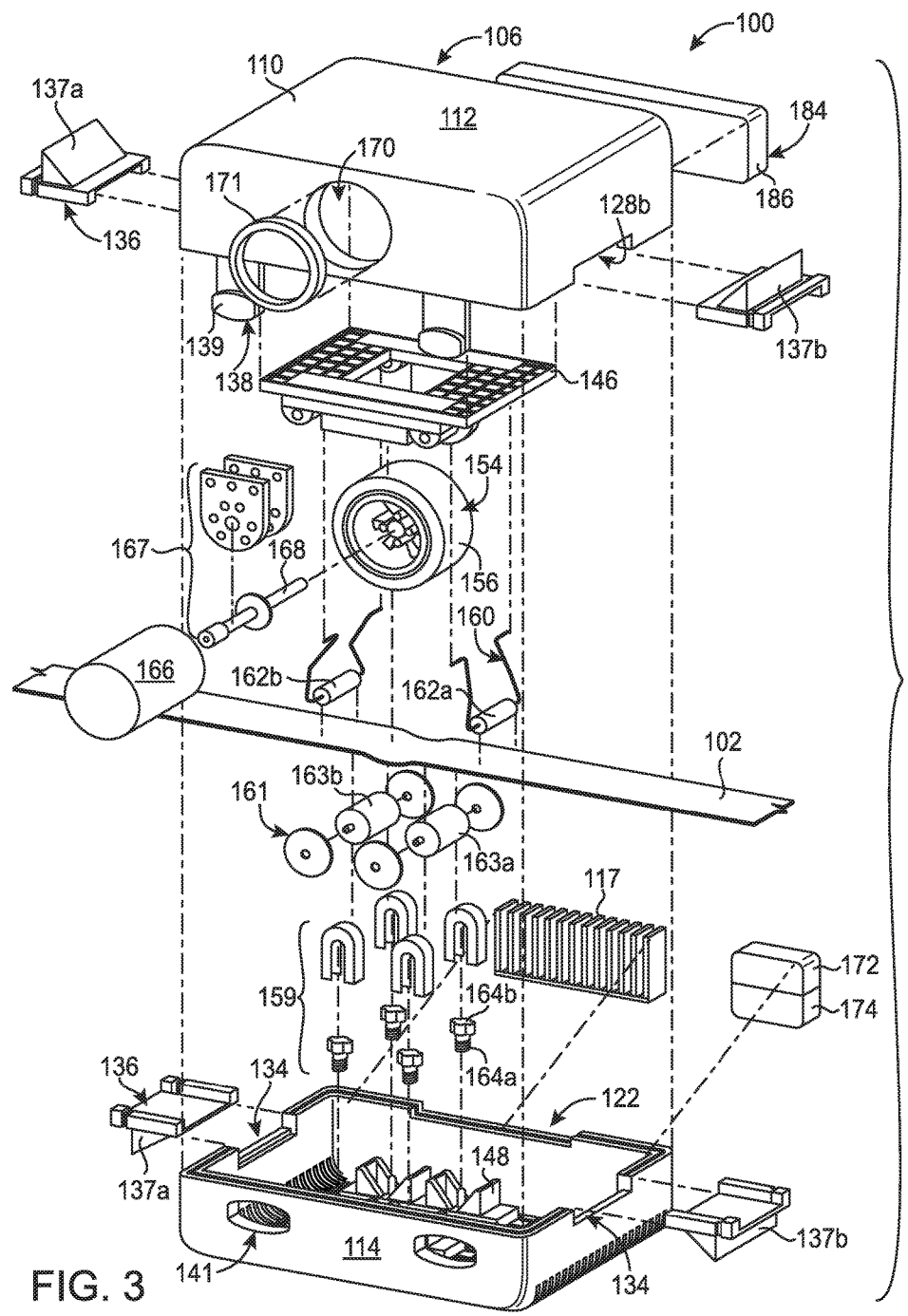
FIG. 3 is an exploded isometric view of the movable platform of FIG. 1.
Figure 4:
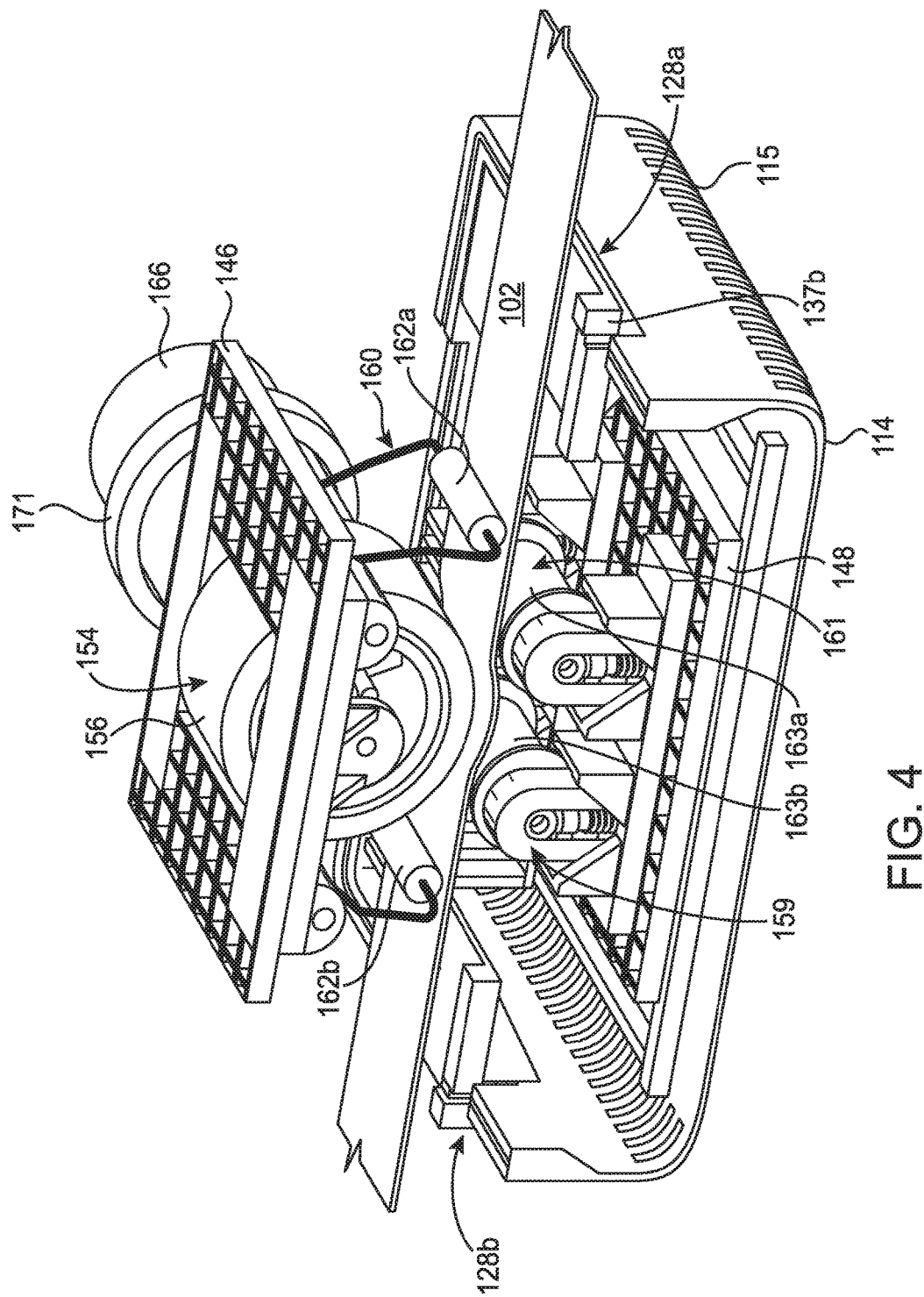
FIG. 4 is a partial interior isometric view of the movable platform system of FIG. 1.

The movable platform 106 may include a housing 110. In the illustrative examples of FIGS. 1-4, the housing 110 may have a rectangular box shape; however, any suitable shape may be used. The housing 110 may be fabricated of any durable lightweight material such as PVC plastic, ABS plastic, PLA plastic filament, titanium, or aluminum. The housing 110 may have a clamshell design that includes an upper portion 112 and a lower portion 114. The housing 110 may also include one or more vents 115 and one or more heat sinks 117. As best seen in FIGS. 3 and 4, the vents 115 and heat sink 117 may be disposed on or in the lower portion 114. The vents 115 and heat sink 117 may enable excess heat to dissipate from the interior of the housing 110.

The upper portion 112 and the lower portion 114 may be movably attached to one another via an attachment mechanism 116. The attachment mechanism 116 may include a hinge member 118 and a hinge rod 119. As shown in the illustrative embodiment of FIG. 2, the attachment mechanism 116 may be disposed along a rear side 120 of the housing 110.

The hinge member 118 may be integrally connected or molded to the upper portion 112. The hinge member 118 may align with a depressed portion 122 of the lower portion 114 of the housing 110 when the upper portion 112 and the lower portion 114 of the housing 110 are mated with each other. The hinge rod 119 (as best seen in FIG. 2) may movably connect the hinge member 118 to the depressed portion 122 of the lower portion 114 so that the upper portion 112 may be moved relative to the lower portion 114 and vice versa. Movably connecting the upper portion 112 to the lower portion 114 may enable the movable platform 106 to be mounted on the drive line 102 without requiring the drive line 102 to be threaded through the housing 110. This in turn may provide for easier mounting and un-mounting of the movable platform 106 onto the drive line 102. Other mechanisms known in the art may be used to movably attach the upper portion 112 of the housing 110 to the lower portion 114 of the housing 110 such as clips, clasps, snap-fit connection points and the like.

The housing 110 may also include a first drive line port 128a on a first side 130 of the housing 110 and second drive line port 128b on a second side 132 of the housing 110 opposite the first side 130 of the housing 110. The first and second drive line ports 128a,b may have any suitable shape that enables a drive line 102 to pass through the housing 110 in a twist resistant manner. In the illustrative embodiments of FIGS. 1-4, the first and second drive line ports 128a,b may have a rectangular shape. The first and second drive line ports 128a,b may be formed by corresponding cut-outs 134 on the upper portion 112 and lower portion 114 of the housing 110 as best seen in FIG. 4. Use of corresponding cut-outs 134 may enable the movable platform 106 to be mounted on the drive line 102 without requiring the drive line 102 to be threaded through the first and second drive line ports 128a,b.

A wormhole 136 may be disposed in each of the first and second drive line ports 128a and 128b. The wormhole 136 helps guide the drive line 102 into and out of the housing 110. The wormhole 136 may be made of any durable material. Preferably, although not necessarily, the wormhole 136 may be fabricated of a self-lubricating material or coated with a material that has a low coefficient of friction, so that the drive line 102 moves easily through the wormhole 136. In addition, the wormhole 136 may be made from two separate portions 137a,b as shown in FIG. 3 that are removably attached to one another so that the drive line 102 does not need to be threaded through the wormhole 136. The wormhole 136 may also be molded into the housing 110 itself so that the upper portion 112 of the housing 110 includes one-half of the wormhole 136, i.e., 137a, and the lower portion 114 of the housing 110 includes the other half, i.e., 137b.

The housing 110 may also include one or more locking mechanisms 138 to fasten the upper portion 112 of the housing 110 to the lower portion 114. The locking mechanism 138 may include a snap-fit fastener 139 disposed on the upper portion 112 that mates with a bore 141 disposed on the lower portion 114 as best shown in FIG. 3 or other device such as a clip, clasp, or rotating lock that may securely attach the upper portion 112 of the housing 110 to the lower portion 114, so that the housing 110 does not open as it travels along the drive line 102. The locking mechanisms 138 may be disposed on a front side 140 of the housing 110 as shown in FIGS. 1 and 3.

Figure 1B:
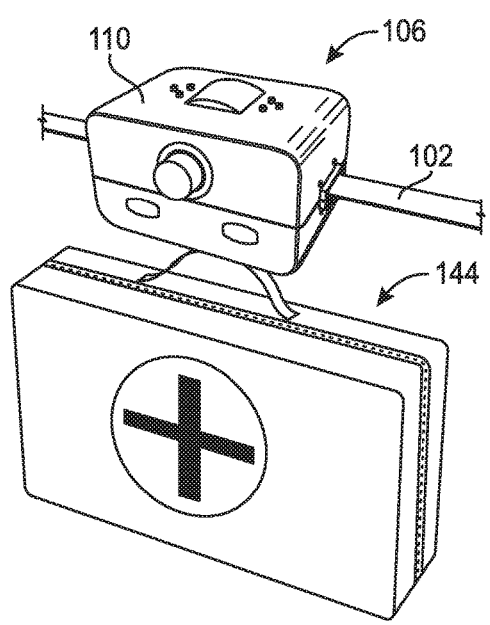
FIG. 1B is an isometric view of another embodiment of the movable platform system of FIG. 1 that may be used to transport equipment or other objects.

The upper and lower portions 112 and 114, respectively, of the housing 110 may include one or more device mounting mechanisms 142. The device mounting mechanism 142 may be a screw hole, hook, clip, or clamp, or any other suitable mechanism known in the art. The device mounting mechanism 142 may enable one or more items 144 (see FIG. 1-1B) such as a gimbal, camera, light, supplies, people, or other device or object to be attached to the upper or lower portions 112, 114 of the housing 110.

Turning to FIGS. 3 and 4, the movable platform 106 may include a first chassis 146 that is fixedly attached to the upper portion 112 of the housing 110 and a second chassis 148 that is fixedly attached to the lower portion 114 of the housing 110. The first chassis 146 and the second chassis 148 may be fixedly attached to the upper and lower portions 112 and 114, respectively, via a screw or any other suitable attachment mechanism such as glue, solder, clips, or clamps.

The movable platform 106 may also include a drive mechanism 154 disposed between the first bore 128a and the second bore 128b of the housing 110. The drive mechanism 154 may be movably mounted on either the first chassis 146 or the second chassis 148. The drive mechanism 154 may be a drive roller 156 (see FIGS. 3 and 4).

One or more guide members 160 may be movably mounted on the first chassis 146 and one or more support members 161 may be movably mounted on the second chassis 148. The support members 161 may be movably mounted via a mounting assembly 159. The mounting assembly 159 may include brackets, washers, springs, and bearing pushers. The guide members 160 and the support members 161 may be disposed adjacent the drive mechanism 154.

The guide members 160 may include one or more guide rollers 162 and the support members 161 may include one or more support rollers 163. The guide members 160 may help guide the drive line 102 toward and away from the drive mechanism 154. The support rollers 161 may provide support and tension to the drive line 102 via springs 164a and bearing pushers 164b.

In the illustrative embodiments of FIGS. 3 and 4, the guide members 160 are guide rollers 162a,b, and the support members 161 are support rollers 163a,b. The guide rollers 162a,b may be mounted on the first chassis 146 on either side of the drive roller 156. The support roller 163a may be disposed between the guide roller 162a and the drive roller 156, and the support roller 163b may be disposed between the drive roller 156 and the guide roller 162b. The drive roller 156, the guide rollers 162a,b, and the support rollers 163a,b may be made of any suitable material such as urethane, rubber, aluminum, steel, metal alloy or any combination thereof.

The guide members 160 and support members 161 may guide, support, and provide tension to the drive line 102 as it passes through the housing 110. As the drive line 102 may extend from the first drive line port 128a to the second drive line port 128b of the housing 110, the drive line 102 may pass between the guide members 160 and support members 161 before and after the drive line 102 engages a surface of the drive mechanism 154. For example, as best seen in FIG. 4, the drive line 102 may pass through the first drive line port 128a and in between rollers 162a and 163a, may engage the drive roller 156, and may then pass in between rollers 162b and 163b before exiting the housing 110 via the second drive line port 128b. Use of the guide and support members 160 and 161, respectively, to provide tension to the drive line 102 may assist the movable platform 106 to move along the drive line 102 in a smoother and more efficient manner thereby reducing the amount of electrical power needed.

The drive mechanism 154 may be operatively connected to a motor 166. The motor 166 may be disposed within the drive mechanism 154 or may be disposed external to the drive mechanism 154 as shown in FIGS. 3 and 4. The motor 166 may be any suitable motor such as a standard RC motor, pancake, hub or in-wheel motor. The motor 166 may provide power to the drive mechanism 154 and cause the drive mechanism 154 to rotate in a forward or backward motion. Power from the motor 166 may be conveyed to the drive mechanism 154 via a drive train 167, which may include an axel 168 as best seen in FIG. 3. As the drive mechanism 154 rotates, the drive line 102 may engage a surface of the drive mechanism 154, which causes the movable platform 106 to travel along the drive line 102. Rotation of the drive mechanism 154 may also cause the drive line 102 to engage a surface of the guide members 160 and support members 161.

The housing 110 may also include a motor port 170 for holding the motor 166 as well as a heat sink collar 171. As shown in the illustrative embodiments of FIGS. 1, 3 and 4, the motor port 170 may be disposed on the front side 140 of the housing 110. The inclusion and use of the motor port 170 and heat sink collar 171 to hold the motor 166 may enable excess heat to dissipate from the motor 166 more quickly than if the motor 166 was disposed completely within the housing 110 as a portion of the motor 166 would be disposed outside the housing 110. The inclusion of the motor port 170 to hold the motor 166 may also enable total volume of the housing 110 to be reduced. Alternatively, the motor 166 may be disposed wholly within an interior of the housing 110 or the drive mechanism 154 itself, in which case a motor port 170 may or may not be provided. Further, a grill, screen, and/or louvered vents may be disposed on the motor port 170 to enable excess heat to escape the housing 110 and to provide protection against weather and other environmental elements, e.g., rain, snow, dust, and debris.

The movable platform 106 may also include a controller 172 electrically connected to the motor 166. The controller 172 may be used to regulate the speed and direction at which the drive mechanism 154 rotates. The controller 172 may be programmable such that the speed of the drive mechanism 154 may be increased or decreased or the direction of rotation may be changed at a preset location or time.

The movable platform 106 may also include a receiver 174 electronically connected to the controller 172 for receiving commands from a transmitter 176 (see FIG. 1). The controller 172 and receiver 174 may be contained within the same device as shown in FIG. 3 or may be separate devices. The transmitter 176 may be a remote control 178 (as shown in FIG. 1) or a communication device 180 embedded in the drive line 102 (see FIG. 10C) as discussed in more detail below. The transmitter 176 may also be a wireless device such as a smart phone, tablet, or laptop, or any other suitable device for transmitting data to the receiver 174. The wireless device may include a software application that controls movement of the movable platform 106, provides live feed from devices 144 mounted on the platform, provides editing capabilities and/or enables cloud data storage, for example.

The receiver 174 and transmitter 176 may be used to direct the controller 172 to increase or decrease the speed at which the movable platform 106 is moving or change the travel direction of the movable platform 106. The receiver 174 and transmitter 176 may also be used, for example, to turn a power source or any of the other electrical components on or off.

The receiver 174 and the transmitter 176 may be used to communicate commands to a device 144 mounted on the movable platform 106 such as a camera 145 and a camera mount 147 as shown in FIG. 1. For example, the transmitter 176 may be used to control the direction or angle of the focus on the camera 145. Similarly, the camera mount 147 may be a gimbal based 3-axis controller that is mounted to the movable platform 106 and commands may be communicated to control the camera mount 147 such that it stays focused on an object while the camera 145 moves. Of course, additional uses of the transmitter 176 and receiver 174 are possible and are contemplated.

The transmitter 176 may also be a sensor such as a proximity sensor that may be attached to or embedded in a target such as person or an object and used to track the movement of the target. The sensor may be in communication with the receiver 174 and may transmit the position or speed of the target to the receiver 174. Based on the transmissions received from the sensor, the controller 172 may cause the movable platform 106 to move along the drive line 102 in a desired direction or speed, using the target as a reference. The movable platform 106 may move in the same direction or speed as the target, or may move in a different direction or speed as the target.

The movable platform 106 may also include a power source 184 to provide electrical power to movable platform 106. The power source 184 may be electronically connected to the motor 166 and other electrical components such as the controller 172 and the receiver 174. The power source 184 may be a battery 186 as shown in FIG. 3 or a solar cell, for example. The power source 184 may be disposed within the housing 110 of the movable platform 106 or it may disposed on an exterior of the housing 110 of the movable platform 106. The power source 184 may also be imbedded in the drive line 102 with connection points in the anchor assembly 200.

The movable platform 106 may also include one or more balancing weights. The balancing weights may be attached to an exterior of the housing 110 and/or may be contained within the housing 110 of the movable platform 106. The balancing weights may be used to offset the weight of an item 144 that is attached to the housing 110 so that the movable platform 106 stays substantially level as it moves along the drive line 102.

Figure 5:
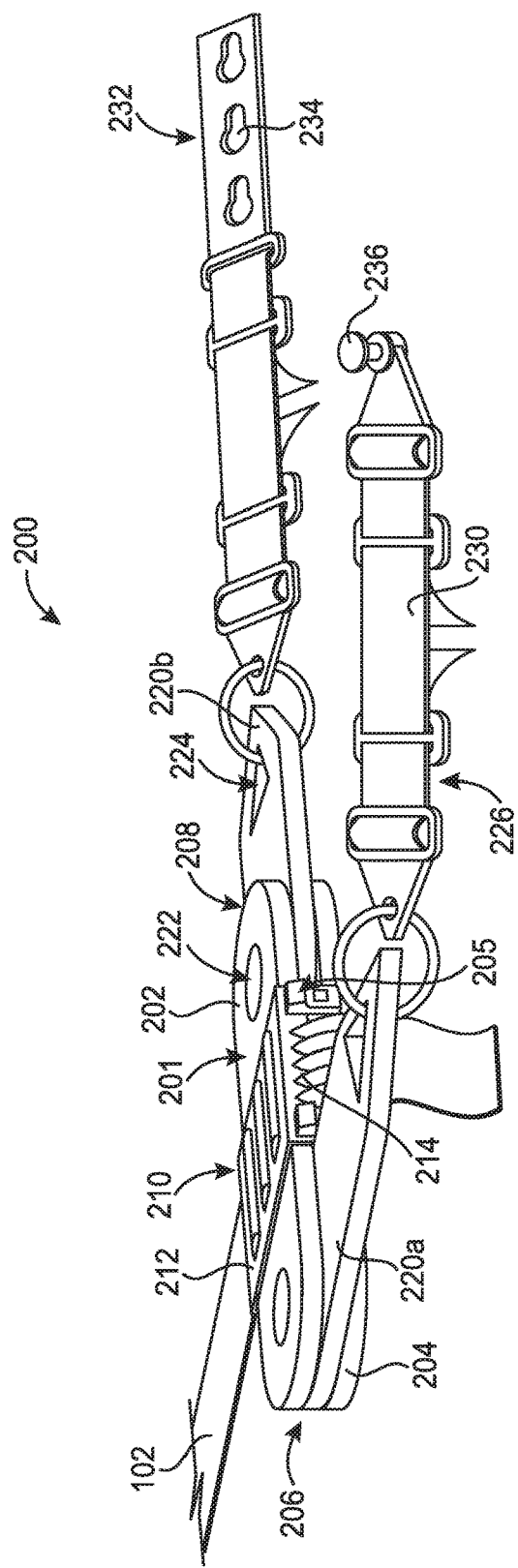
FIG. 5 is a trimetric view an embodiment of an anchor assembly.
Figure 6:
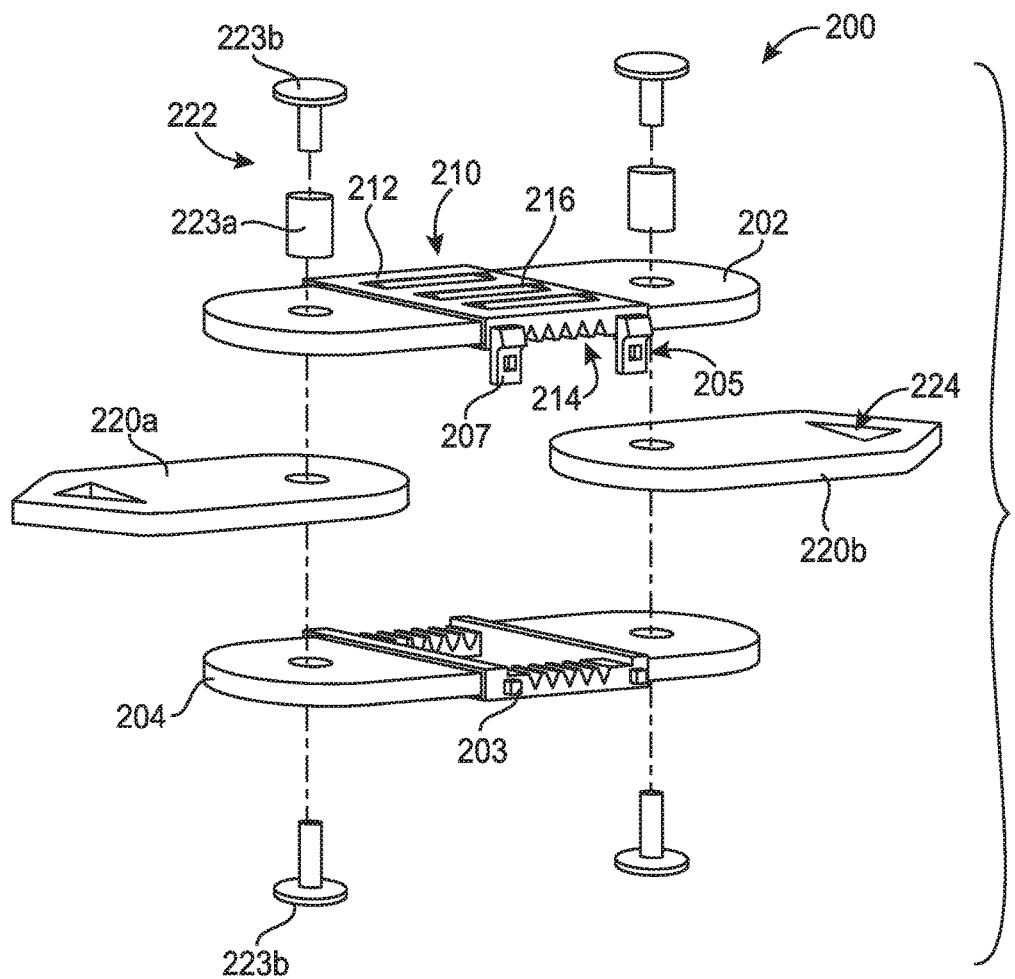
FIG. 6 is a partial exploded trimetric view of a drive line mount of the anchor assembly of FIG. 5.
Figure 7:
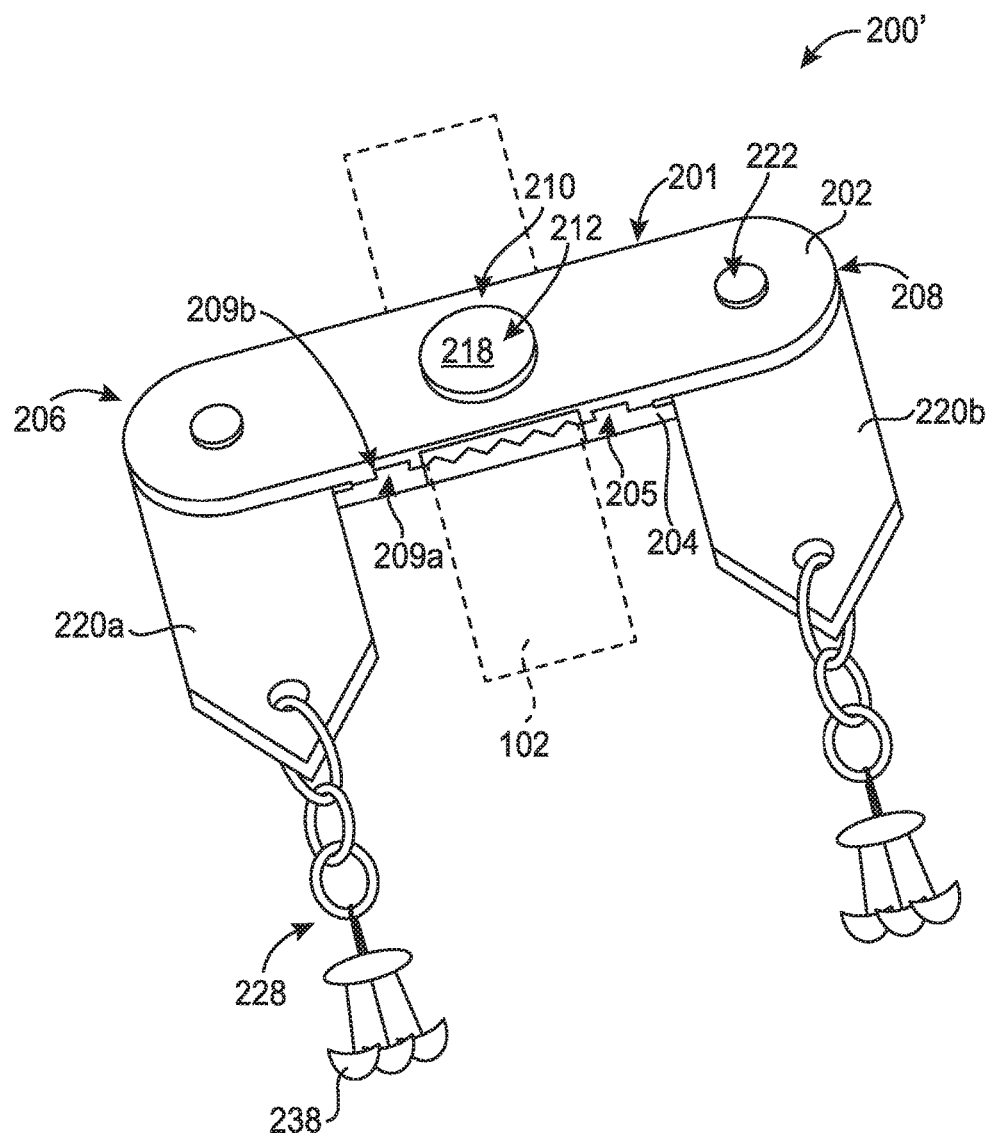
FIG. 7 is a perspective view of another embodiment of the anchor assembly of FIG. 5.

As noted above, the movable platform system 100 may also include anchor assembly 200. FIGS. 5 and 6 show one embodiment of an anchor assembly 200, and FIG. 7 shows another embodiment of an anchor assembly 200'. The anchor assembly 200, 200' may include a drive line mount 201. The drive line mount 201 may include an upper member 202 and a lower member 204 as best seen in FIG. 6. The upper member 202 and the lower member 204 may be attached to each other via arm attachment member 222 discussed below. The upper and lower members 202, 204 may also be attached to one another via connection member 205. The connection member 205 may include protrusions 203 and tabs 207 as shown in FIGS. 5 and 6 or a dove tail tongue 209a and a dove tail groove 209b as shown in FIG. 7. The drive line mount 201 may also have a first end portion 206, a second end portion 208, and a center portion 210 disposed between the first end portion 206 and the second end portion 208. The first end portion 206, the center portion 210, and the second end portion 208 may be disposed linearly as shown in FIGS. 5-7.

The center portion 210 of the drive line mount 201 may include a drive line retainer fastener 212 and a set of drive line retainer teeth 214 disposed on the center portion 210 of the drive line mount 201 adjacent to the drive line retainer fastener 212. The drive line retainer fastener 212 and the set of drive line retainer teeth 214 may each be configured to engage and secure the drive line 102 to the drive line mount 201. The drive line retainer fastener 212 may include one or more slots 216 as shown in FIGS. 5 and 6, through which the drive line 102 is woven. The drive line retainer fastener 212 may also include a drive line screw 218 as shown in the anchor assembly 200' of FIG. 7. The drive line screw may be a dial with an embedded bolt that pushes an internal grip plate against the drive line 102.

As shown in FIGS. 5-7, the drive line 102 may be secured to the drive line mount 201 between the upper and lower members 202, 204 of the drive line mount 201. The drive line retainer teeth 214 are pulled together and clamp down on the drive line 102 when the upper and lower members 202, 204 of the anchor assembly 200, 200' are attached to one another via the connection member 205 and an arm attachment member 222 discussed below.

The anchor assembly 200, 200' may also include a first swing arm 220a and a second swing arm 220b. The first swing arm 220a may be movably attached to the first end portion 206 of the drive line mount 201 and the second swing arm 220b may be movably attached to the second end portion 208 of the drive line mount 200. The first swing arm 220a and the second swing arm 220b may be movably attached to the first end portion 206 and the second end portion 208, respectively, via the arm attachment member 222. The arm attachment member 222 may be any suitable device that may movably attached the first and second swing arms 220a, 220b to the first and second end portions 206, 208 such as a pivot collar 223a and pivot pins 223b as shown in FIG. 6. The first and second swing arms 220a,b may be disposed between the upper portion 202 and lower portions 204 of the drive line mount 201 as best seen in FIG. 6 and used to mount the drive line mount 201 to an anchoring object.

As shown in FIGS. 5 and 7, the first and second swing arms 220a,b may include a swing arm sleeve 224 to which a harness assembly 226 or rock anchor assembly 228 is attached. The harness assembly 226 may be configured to engage an anchoring object. For example, as shown in FIG. 5, the harness assembly 226 may include an adjustable strap 230 and a lock member 232 such as key groove 234 and key groove post 236. The anchor assembly 200 may also include a rock anchor assembly 228 attached to the first swing arm 220a and/or the second swing arm 220b. The rock anchor assembly 228 may be configured to engage a rock crevice. For example, as shown in FIG. 7, the rock anchor assembly 228 may include one or more cams 238 for anchoring the drive line mount 102 to a rock.

Figure 8:
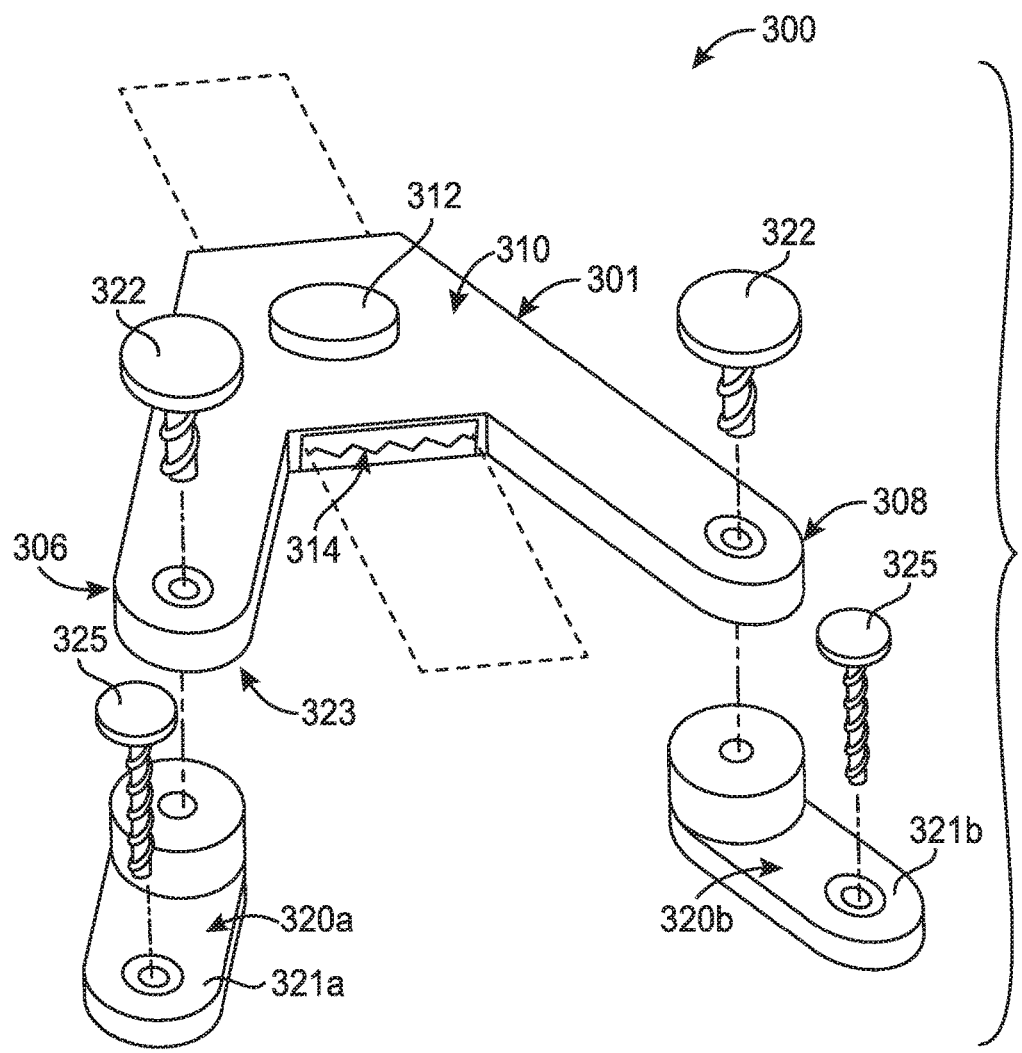
FIG. 8 is a perspective view of an embodiment of an anchor assembly.

FIG. 8 shows an alternate embodiment 300 of the anchor assembly 200. The anchor assembly 300 may include a drive line mount 301. The drive line mount 301 may include a first end portion 306, a second end portion 308, and a center portion 310 where the first end portion 306 and the second end portion 308 may be disposed at an angle relative to the center portion 310. The center portion may include a drive line fastener 312 and drive line retainer teeth 314. The anchor assembly 300 may also include a first swing arm 320a attached to the first end portion 306 and a second swing arm 320b attached to the second end portion 308, where the first swing arm 320a and the second swing arm 320b may be mounting feet 321a and 321b, respectively. The mounting feet 321a,b may be movably attached via an attachment member 322 to a bottom side 323 of the drive line mount 301. The mounting feet 321a,b may be used to directly attach the first swing arm 320a and/or the second swing arm 320b to an anchoring object, for example, a cement or wood object, via an anchoring screw 325.

Figure 9:
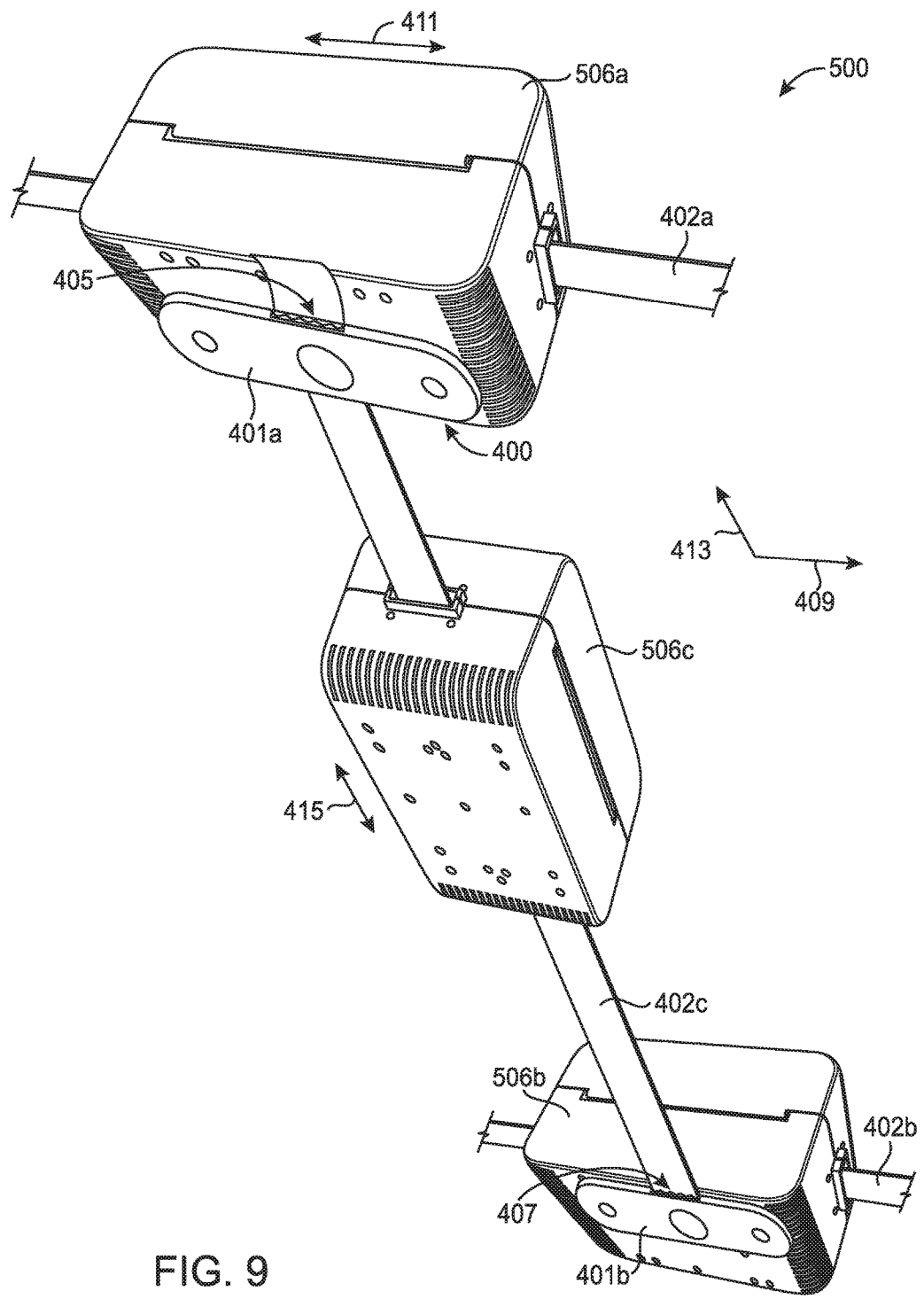
FIG. 9 is a perspective view of another embodiment of a movable platform system.

FIG. 9 shows another embodiment of a movable platform system 500 using an anchor assembly 400. In this embodiment, the anchor assembly 400 may include a first drive line mount 401a and a second drive line mount 401b. The first drive line mount 401a may be attached to a first movable platform 506a and the second drive line mount 401b may be attached to a second movable platform 506b. The first movable platform 506a may be attached to a first drive line 402a and the second movable platform 506b may be attached to a second drive line 402b. The first drive line 402a and the second drive line 402b may be mounted via one or more anchor assemblies so that the first and second drive lines 402a,b may be disposed in the same plane. The first and second drive lines 402a,b may be a rigid line such as a flat metal bar or may be made from a flexible or semi-flexible material as discussed below with respect to FIGS. 10A-10D. The first and second drive lines 402a,b may be mounted along a first axis 409 (e.g., an x-axis) such that the first and second movable platforms 406a,b travel along the first and second drive lines 402a,b in a first direction 411 (e.g., a horizontal direction).

A third drive line 402c may be attached to the first drive line mount 401a at a first end area 405 and attached to the second drive line mount 401b at a second end area 407, opposite the first end area 405. The third drive line 402c may be attached to the first and second drive line mounts 401a,b such that the third drive line 402c may be oriented along a second axis 413 (e.g., a y-axis) that may be perpendicular to the first axis 405. A third movable platform 506c may be movably attached to the third drive line 402c and travel substantially along the third drive line 402c in a second direction 415 (e.g., vertical direction) that may be perpendicular to the first direction 411.

The drive line 102 may have a first end 190 and a second end 192 (see FIG. 1), opposite the first end. The drive line 102 may be removable attached to any of the aforementioned anchor assemblies via its first end 190, its second end 192, or at any other point along the drive line 102. The drive line 102 may be oriented in a substantially vertical position such that the movable platform 106 moves along the drive line 102 in the y-direction or in a substantially horizontal position such that the movable platform 106 moves along the drive line 102 in the x-direction.

The drive line 102 may be a cable or a tape as shown in FIGS. 1-4 and 10A-10D. As noted above, the drive line 102 may have at least one substantially flat surface 104 such that the movable platform 106 and any item 144 mounted to the movable platform 106 such as camera 145 may move in a smooth and level manner using the flat surface 104 to assist in keeping the movable platform 106 and the camera 145 from twisting in an unwanted manner. The drive line 102 may be made of a natural or synthetic fabric material and/or metal. For example, the drive line 102 may be made from nylon, Kevlar®, polyester, metal mesh webbing, or rubber with embedded steel cables.

Figure 10A:
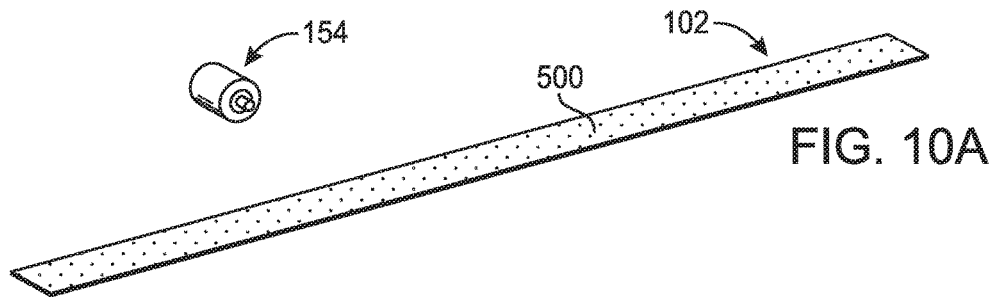
FIG. 10A is an isometric view of an embodiment of a drive line.
Figure 10B:
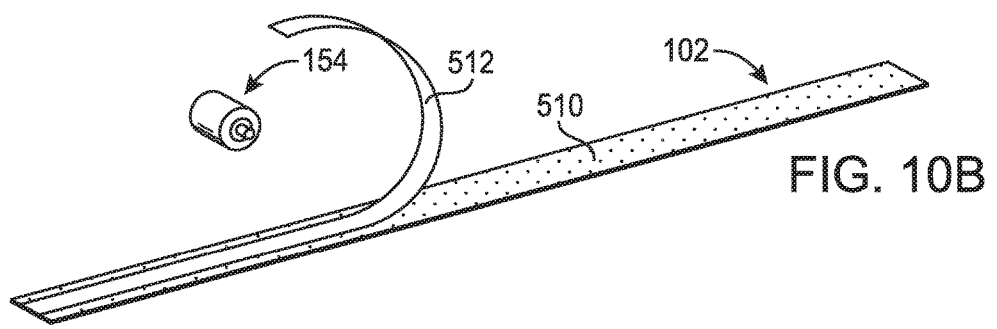
FIG. 10B is an isometric view of an embodiment of a drive line that includes a grip layer.

FIGS. 10A-10D illustrate different embodiments of the drive line 102. As shown in FIG. 10A, the drive line 102 may be a tape 500 that is woven of a tear resistant material such as nylon, Kevlar®, or polyester. FIG. 10B illustrates an embodiment of the drive line 102, in which the drive line 102 includes a tape 510 that may be woven from a tear resistant material and a grip layer 512 that may be attached to one or more sides of the tape 510. The grip layer 512 may provide increased traction and reduced friction and may be made from any suitable material including, for example, plastisol, liquid rubber, or elasto-plastics.

Figure 10C:
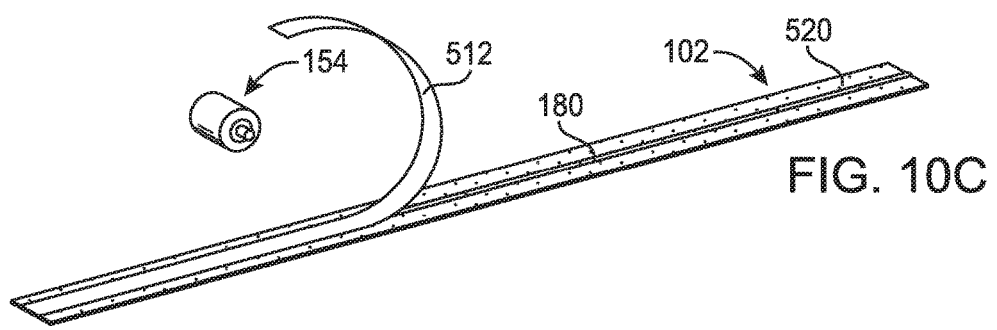
FIG. 10C is an isometric view of another embodiment of the drive line of FIG. 10B that includes a communication track.

As shown in FIG. 10C, the drive line 102 may include a tape 520 and a communication track 180 that extends along and is integrally connected to the tape 520. The tape 520 may also include a grip layer 512 as discussed above. In this embodiment, the tape 520 may be made of a material that is non-conductive such as nylon, Kevlar®, or polyester.

The communication track 180 may transmit communication signals to the controller 172 via, for example, data pickups in the wormholes, which may be in contact with or that engage the communication track 180. The communication track 180 may also provide power to the motor 166 via, for example, power pickups in the drive mechanism 154, which may be in contact with or that engage the communication track 180. The communication track 180 may be activated via an adapter disposed in the anchor assembly. The adapter may include contact points that connect with the communication track 180 as well as one or more input ports accessible through an outer surface of the anchor assembly. The input ports may be used to connect the adaptor to a power source such as a battery, generator, solar cell and the like. The input ports may also transfer data.

Figure 10D:
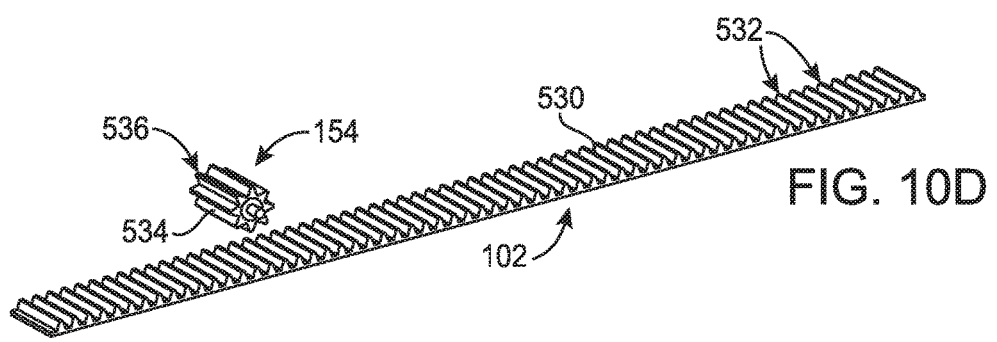
FIG. 10D is an isometric view of an embodiment of a drive line and drive mechanism that includes a gear drive roller and sprocket tape drive line.

FIG. 10D illustrates a sprocket tape 530 having tracks 532. The tracks 532 may be made of rubber and may have steel cables embedded therein to increase lateral stability or may be made of any other suitable material or combinations of materials. In this embodiment, the drive mechanism 154 may be a gear drive roller 534 having sprockets 536 that are configured to engage the sprocket tape 530.

Use of a tape drive line made of a fabric material may be advantageous because it is much lighter than a cable. A tape drive line may also have a larger contact surface area than a cable, which may provide greater stability as the movable platform 106 travels along the tape. A tape drive line made of a fabric material may be lower cost than a cable and lighter. A fabric tape drive line may also be safer than a cable. Cables may snap and cause injury to bystanders. If a fabric tape breaks, it may ribbon-down as it falls and not cause injury due to a higher drag coefficient. A fabric tape drive line is also non-conductive and may be customizable with other material. For example, a fabric tape drive line may be embedded with a power source or low-voltage electrical wires as discussed above that may be used to send commands to the controller 172 of the movable platform 106, to the camera 145, to a camera mount 147 as discussed above, etc. Materials such as Kevlar® may also be built into the fabric material to add strength and durability.

Uses of the movable platform system 100 may include, but are not limited to: filming; photography; surveillance; transportation and rescue (see FIG. 1B); supply distribution (see FIG. 1C); illumination; solar panel and building maintenance; and target acquisition/deployment. The movable platform system 100 may also be used in a number of industries such as military, entertainment, law enforcement, sports, fire and rescue, aid relief, hunting, farming, and animal control.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention. A recitation of "a", "an" or "the" is intended to mean "one or more" unless specifically indicated to the contrary. Recitation of "and/or" is intended to represent the most inclusive sense of the term unless specifically indicated to the contrary.

While the present disclosure may be embodied in many different forms, the drawings and discussion are presented with the understanding that the present disclosure is an exemplification of the principles of one or more inventions and is not intended to limit any one of the inventions to the embodiments illustrated.

Further advantages and modifications of the above described system and method will readily occur to those skilled in the art. The disclosure, in its broader aspects, is therefore not limited to the specific details, representative system and methods, and illustrative examples shown and described above. Various modifications and variations may be made to the above specification without departing from the scope or spirit of the present disclosure, and it is intended that the present disclosure covers all such modifications and variations provided they come within the scope of the following claims and their equivalents.

We claim:

1. A movable platform, comprising:
a housing having a first side and a second side opposite the first side, the first side having a first port and the second side having a second port, the first and second ports being configured to receive a drive line having at least one flat side in a twist resistant manner;
a drive mechanism disposed between the first port and the second port for engaging the drive line;
a guide member disposed adjacent the drive mechanism for guiding the drive line toward or away from the drive mechanism; and
a motor operatively connected to the drive mechanism, wherein the motor provides power to the drive mechanism and causes the drive mechanism to rotate.

2. The movable platform of claim 1, in combination with a drive line.

3. The movable platform of claim 2, wherein the drive line extends from the first port to the second port of the housing and engages a surface of the drive mechanism, and wherein rotation of the drive mechanism causes the housing to move along the drive line.

4. The movable platform of claim 1, wherein the drive mechanism is one of a pulley and roller.

5. The movable platform of claim 1, wherein the guide member is one of a pulley and roller.

6. The movable platform of claim 1, further comprising a mounting mechanism attached to the housing, wherein the mounting mechanism is a screw hole, hook, clip, dial, or clamp.

7. The movable platform of claim 1, further comprising a power source connected to the motor that supplies electrical power to the motor.

8. The movable platform of claim 7, wherein the power source is a battery.

9. The movable platform of claim 1, further comprising a controller electrically connected to the motor, wherein the controller regulates the speed at which the drive mechanism rotates.

10. The movable platform of claim 9, wherein the controller is programmable.

11. The movable platform of claim 9, further comprising a receiver electronically connected to the controller for receiving commands from a transmitter.

12. A movable platform system, comprising:
a movable platform, the movable platform comprising:
a housing having a first side and a second side opposite the first side, the first side having a first port and the second side having a second port;
a drive mechanism disposed between the first port and the second port;
a drive line having at least one flat side, wherein the drive line extends through the housing of the movable platform via the first port and the second port and engages a surface of the drive mechanism and wherein the movable platform is mounted to the drive line in a twist resistant manner; and
a motor operatively connected to the drive mechanism for rotating the drive mechanism, wherein rotation of the drive mechanism causes the movable platform to move along the drive line.

13. The system of claim 12, wherein the drive line has a first end and a second end opposite the first end, and wherein one or more of the first end and second end of the drive line is removably attached to an anchor assembly in a twist resistant manner.

14. The system of claim 12, wherein the drive line is oriented such that the movable platform moves along the drive line in a first direction, wherein the first direction is a substantially horizontal direction.

15. The system of claim 12, further comprising at least one set of support members disposed adjacent the drive roller, wherein the drive line extends through the at least one set of support members.

16. The system of claim 12, wherein the drive line is a tape woven from a tear resistant material.

17. The system of claim 12, wherein the drive line includes a grip layer attached to an exterior of the drive line, wherein the grip layer increases the surface area of the drive line that comes into contact with the drive mechanism.

18. The system of claim 12, wherein the drive line includes a communication track extending along and integrally connected to the drive line.

19. The system of claim 18, wherein the communication track is in electronic communication with a receiver disposed within the housing, wherein the receiver receives commands from the communication track.

20. The system of claim 18, wherein the communication track provides power to the motor.

21. The system of claim 12, wherein the drive line is a sprocket tape and the drive mechanism is a gear drive roller that engages the sprocket tape.

* * * * *